(12) United States Patent
Alleman, Jr. et al.

(10) Patent No.: US 6,909,068 B1
(45) Date of Patent: Jun. 21, 2005

(54) ALL-TERRAIN UNDERCARRIAGE

(75) Inventors: George M. Alleman, Jr., Mentor, OH (US); Roland Zeder, Pittsburgh, PA (US); Alex Bally, Pittsburgh, PA (US)

(73) Assignee: Lincoln Global, Inc., Cleveland, OH (US)

( * ) Notice: Subject to any disclaimer, the term of this patent is extended or adjusted under 35 U.S.C. 154(b) by 725 days.

(21) Appl. No.: 09/411,106

(22) Filed: Oct. 4, 1999

(51) Int. Cl.⁷ ............................................... B23K 9/00
(52) U.S. Cl. ....................................................... 219/136
(58) Field of Search ........................... 280/7.1, 87.01, 280/47.34, 33.994; 219/136

(56) References Cited

U.S. PATENT DOCUMENTS

| | | | |
|---|---|---|---|
| 3,108,179 A | | 10/1963 | Ulli |
| 3,237,051 A | | 2/1966 | Schober |
| 3,471,046 A | | 10/1969 | Hess |
| 3,596,048 A | * | 7/1971 | Maeda ................. 219/125 PL |
| 3,682,342 A | | 8/1972 | Evans |
| 3,734,196 A | * | 5/1973 | Mangum ...................... 172/16 |
| 4,010,346 A | * | 3/1977 | Cecil et al. ............ 219/125 PL |
| 4,062,430 A | * | 12/1977 | Momberg ................. 191/12 R |
| 4,175,224 A | * | 11/1979 | Sims et al. ............... 219/60 R |
| 4,573,665 A | | 3/1986 | Strohl et al. |
| 4,738,582 A | * | 4/1988 | Roberts ....................... 414/546 |
| 4,926,768 A | * | 5/1990 | Magda .......................... 111/11 |
| 5,029,891 A | * | 7/1991 | Jacobs ......................... 280/650 |
| 5,440,098 A | | 8/1995 | Matus |
| 5,653,305 A | * | 8/1997 | Duke ........................... 182/13 |
| 5,685,385 A | * | 11/1997 | Sanuga ...................... 180/65.1 |
| 5,695,212 A | * | 12/1997 | Hinkston .................... 280/642 |
| 5,730,891 A | | 3/1998 | Karpoff et al. |
| 5,868,407 A | * | 2/1999 | Roese ................... 280/47.371 |
| 6,129,166 A | * | 10/2000 | Sueshige et al. ........... 180/65.6 |

* cited by examiner

Primary Examiner—Colleen P. Cooke
(74) Attorney, Agent, or Firm—Fay Sharpe Fagan Minnich & McKee; Brian E. Turung; Robert V. Vickers (57) ABSTRACT

A moveable undercarriage for supporting and moving a welder over a ground surface having a base to support the welder, a front and rear axle secured to the base each having two wheels rotatably secured to the axles, and a push bar secured to said base to move the base over a ground surface. The front and rear axles are positioned on the base such that the center of gravity of the welder lies between the axles. The front and rear axles are spaced apart a distance that is less than three times the sum of the radii of the front and rear wheels. The undercarriage includes a brake to engage at least one wheel in a locked position. The push bar has a lift bar to facilitate in the moving of the base.

50 Claims, 9 Drawing Sheets

ALL-TERRAIN UNDERCARRIAGE

The present invention relates to the art of welding and more particularly to an undercarriage for supporting a welder and/or power supply as it is moved between two or more locations.

BACKGROUND OF THE INVENTION

It is common practice in the welding industry to mount a welder onto an undercarriage having roller wheels and/or casters so that the welder can be transported to different locations. The undercarriage typically includes a welder fixed to a base member of the undercarriage and a handle to move the welder and undercarriage manually between locations. Several different types of undercarriage designs are disclosed in U.S. Pat. Nos. 3,108,179; 3,237,051; 3,471,046; 3,682,342; 4,573,665; 4,738,582; 5,440,098; and 5,730,891, all of which are incorporated herein by reference.

In many instances, the welder is used out in the field where the ground surface is rough, unlevel, and/or is made up of different compositions. In such environments, many of the past undercarriages could not be used in such environments, or are difficult to use in such environments. Many prior undercarriages cannot be used in soft terrains since the wheels of the undercarriage sink into the ground due to the massive weight of the welder, which is typically several hundred pounds. In addition, many of these welders have a tendency to tip when moved over uneven terrain. These prior undercarriages are also difficult to maneuver over curbs or obstacles on a ground surface. The configuration of these undercarriages require the operator to move the fill weight of the undercarriage and the welder when maneuvering the undercarriage and welder over a curb or other obstacle on the ground surface. As a result, multiple operators are required to transport heavier welders.

In view of the deficiencies of past undercarriages, there is a need for an undercarriage for a welder and/or power supply which can be used in a wide variety of terrains, which provide improved stability when moving, and which can be easily maneuvered over curbs or other obstacles in a terrain thereby reducing the number of operators needed.

SUMMARY OF THE INVENTION

The present invention relates to an undercarriage for supporting heavy equipment such as a welder and/or power supply to enable the equipment to be more easily and conveniently moved between a variety of locations. As can be appreciated, the undercarriage can be used to transport a variety of different objects over various types of terrains, such as tools, compressors, generators, and other types of heavy or difficult to move machinery, thus the undercarriage is not limited to use with only welder and/or power supplies. However, the invention will be specifically described with respect to use with welders and/or power supplies.

In accordance with the principal embodiment of the present invention, there is provided an undercarriage for a welder and/or power supply which facilitates in the movement of the welder and/or power supply from location to location in a facility or area using the welder and/or power supply. The undercarriage includes a base for supporting the welder and/or power supply, a plurality of axles and/or spindles secured to the base, at least one wheel secured to each axle and/or spindle, and a push bar. The undercarriage is designed to provide adequate clearance of the underside of the undercarriage from the ground so that the undercarriage can transverse a variety of terrains, whether rough or smooth, when transporting the welder and/or power supply from location to location. The positioning of the axles and/or spindles on the undercarriage are selected so that the center of gravity of the welder and/or power supply secured to the base of the undercarriage is positioned on one of the axles and/or spindles or between the two furthest spaced apart axles and/or spindles.

As can be appreciated, the undercarriage can be a separate component from the welder and/or power supply, or can be integrated with the parts of the welder and/or power supply. In one preferred embodiment, only two axles are secured to the undercarriage. In one specific embodiment, at least one axle and/or spindle is secured to the base of the undercarriage. In another specific embodiment, two wheels are rotatably secured to each axle. In another preferred embodiment, the positioning of the two furthest spaced apart axles and/or spindles along the longitudinal length of the undercarriage or welder and/or power supply are selected such that the center of gravity of the welder and/or power supply is positioned between the two axles and/or spindles when the undercarriage or welder and/or power supply is in a non-tilted position on a generally flat ground surface. In still another preferred embodiment, the positioning of the two furthest spaced apart axles and/or spindles are selected such that the center of gravity of the welder and/or power supply is positioned on one of the axles and/or spindles or between the two furthest spaced apart axles and/or spindles when the undercarriage is in a tilted position on a generally flat ground surface. In another specific embodiment, the center of gravity of the welder and/or power supply is positioned between the two furthest spaced axles and/or spindles when the undercarriage or welder and/or power supply is positioned in the fully tilted position on a generally flat ground surface.

In accordance with yet another aspect of the present invention, the base of the undercarriage or welder and/or power supply includes at least two axles and/or spindles spaced apart from one another to reduce the amount of force required to move the undercarriage over an obstacle on a ground surface. Such obstacles include, but are not limited to, bumps, curbs, holes grates, hoses, cables, rocks, gravel, sand or other soft surfaces, lumber, pipes and the like. It has been found that by moving the wheels close together and toward the middle of the length of the base of the undercarriage or welder and/or power supply, the movement of the undercarriage or welder and/or power supply over rough surfaces and over different gradients in the ground surface is simpler and requires less force. Maintaining the distance of the two furthest spaced axles and/or spindles up to about 3 times the sum of the radii of the front wheel and the rear wheel has been found to achieve this objective. The axles and/or spindles are positioned on the base so that the center of gravity of the welder and/or power supply is positioned between the two axles and/or spindles when the undercarriage or welder and/or power supply is positioned on a generally flat ground surface. In one preferred embodiment, the front and rear axle and/or spindle on the undercarriage or welder and/or power supply are spaced no more than three times the sum of the radius of the front and rear wheels, and more preferably about 1 to 2.5 times the sum of the radius of the front and the rear wheels, and more preferably about 1 to 1.5 times the sum of the radius of the front and the rear wheels. In another preferred embodiment, the two furthest spaced axles and/or spindles are positioned along the base of the undercarriage or welder and/or power supply such that one axle and/or spindle is positioned on one side of the midpoint along the length of the base and the other axle and/or spindle is positioned on the other side of the midpoint along the length of the base. In one specific embodiment, the rear axle and/or spindle of the undercarriage or welder and/or power supply is positioned closer to the midpoint of the base than the front axle and/or spindle. In still another preferred embodiment, the diameter of the wheels on the front and rear axle and/or spindles are at least 6 inches, and preferably, about 8 to about 20 inches in diameter. The diameter of the wheels preferably should be at least 6 inches to enable the wheel to transverse non-flat ground surfaces. Wheels smaller than 6 inches tend to easily get stuck in soft soil, gravel and/or sand or will not easily roll over rough surfaces. Preferably, the wheel diameter of the smallest wheel on the undercarriage is at least 7 inches in diameter. In accordance with still yet another preferred embodiment, the in diameter of the front wheel is less than the diameter of the rear wheel. The larger diameter rear wheel provides for easier rolling of the undercarriage over rough surfaces and reduces the force necessary for the operator to push the undercarriage and to move the undercarriage over obstacles. The smaller front wheel permits the axles and/or spindles of the front and rear wheels to be closer to the center of gravity and closer together and such closeness makes it easier to move the front of the undercarriage or welder and/or power supply over an obstacle. In one specific embodiment, the diameter of the front wheel is about 6 to 14 inches, and the diameter of the rear wheel is about 10 to 20 inches in diameter. In another specific embodiment, the diameter of the front wheels is about 8–12 inches, the diameter of the rear wheels is about 14–18 inches, the undercarriage has two axles whereby the distance of the front axle from the rear axle is between 1 to 1.4 times the sum of the radii of the front plus the rear wheels.

In accordance with a further embodiment of the present invention, the location of the axle and/or spindle on the base and the diameter of the wheels on the axles and/or spindles is selected so that the top of the base of the undercarriage or welder and/or power supply lie in a plane which is generally parallel to a generally flat ground surface. When the diameter of the front and rear wheels are different, the spacing of the axles and/or spindles on the welder and/or power supply, or from the top surface of the base of the undercarriage is positioned to account for the differing wheel diameters. In one preferred embodiment, the rear wheels have a greater diameter than the front wheels, and the rear axle and/or spindle is spaced closer to the top of the base than the front axle and/or spindle.

In accordance with still a further embodiment of the present invention, the axle and/or spindle position and the diameter of the wheels on the axles and/or spindles are selected so that the lowest point of the base of the undercarriage or welder and/or power supply is spaced at least 2 inches, and preferably 3 to 10 inches, above a generally flat ground surface. Maintaining the lower part of the base of the undercarriage or welder and/or power supply a sufficient distance above the ground surface enables the base undercarriage or welder and/or power supply to pass over rough terrain without contacting the ground surface during transport. In one preferred embodiment, the bottom of the undercarriage or welder and/or power supply lies in a plane generally parallel to a generally flat ground surface. In one specific embodiment, the bottom of the undercarriage or welder and/or power supply lies in a plane generally parallel to a flat ground surface and spaced above the ground surface about 3 to 6 inches.

In another aspect of the present invention, the width of the wheels is selected to reduce the tendency of the wheels to sink into a ground surface during the transport of the welder and/or power supply. Preferably, the width of the wheels is at least 2 inches and more preferably, about 2.5 to 7 inches. This width has been found, in combination with the diameter of the wheels, to enable the undercarriage or welder and/or power supply to be rolled over gravel areas, grass surfaces, sand surfaces, and other soft ground surfaces. Wheels having a narrower width have a tendency to sink into the soft ground area thereby becoming stuck and preventing movement of the undercarriage or welder and/or power supply over such ground surface. In one specific embodiment, the width of the front wheels is about 2.75 to 3.5 inches and the diameter of the front wheel is about 8 to 12 inches, and the width of the rear wheels is about 3.75 to 4.5 inches, and the diameter of the rear wheels is about 14 to 16 inches.

In accordance with still yet another aspect of the present invention, the ratio of the radius of the front wheel to the rear wheel is selected to enable the undercarriage or welder and/or power supply to easily be maneuvered over a curb or other obstacle on a ground surface. In such an arrangement, the rear wheel has a radius which is larger than the front wheel radius. The smaller front wheel allows the axles and/or spindles of the front and rear wheels to be closely spaced. The spacing of the front axle and/or spindle to the rear axle and/or spindle is also maintained to reduce the amount of energy needed to rotate the undercarriage or welder and/or power supply on the rear axle and/or spindle, and to move the rear of the undercarriage over a curb surface or other obstacle once the front wheel has been moved onto the top of the curb surface or other obstacle. By positioning the front and rear axles and/or spindles close together, and further by positioning the axles and/or spindles so that the center of gravity of the welder and/or power supply is positioned between the axles and/or spindles, a fraction of the full load of the undercarriage and/or the welder and/or power supply needs to be overcome when moving over a curb surface or other obstacle. The large rear wheel enables the undercarriage or welder and/or power supply to traverse soft and/or rough surfaces and for making it easier to roll the undercarriage on a rough surface. In one preferred embodiment, the underside of the base of the undercarriage is configured so that the front end of the undercarriage is spaced at a larger distance from the ground surface than the middle region of the undercarriage to thereby enable easier positioning of the front end of the undercarriage over a curb surface or other obstacle in the ground surface. In another specific embodiment, the front end of the base of the undercarriage extends beyond the peripheral surfaces of the front wheels. In another preferred embodiment, preferably the rear end of the base of the undercarriage extends beyond the peripheral surface of the rear wheels.

In accordance with a further aspect of the present invention, the undercarriage includes a brake mechanism to lock at least one front and/or rear wheel in position to prevent the undercarriage from freely rolling. Preferably, the lock mechanism is designed to engage one or both of the rear tires of the undercarriage. Preferably, the brake is a resistance brake designed to frictionally engage the surface of the tire to prevent the tire from freely rotating around its axis.

In accordance with another aspect of the present invention, the push bar enables an operator to easily move the undercarriage or welder and/or power supply from location to location. Preferably, the push bar is connected to the welder and/or power supply, or at or near the rear of the base of the undercarriage. In one preferred embodiment, the push bar includes a handle portion oriented to the base of the undercarriage or welder and/or power supply at an angle between 90°–160°, when the push bar is mounted to the welder and/or power supply or the base of the undercarriage. In another preferred embodiment, the push bar includes a handle portion which extends generally perpendicular to the ground surface when the push bar is mounted to the welder and/or power supply, or the base of the undercarriage. Such a positioning of the handle portion increases the ease of operation when pushing and/or pulling the undercarriage or welder and/or power supply over a ground surface, especially a rough ground surface. This angular extension of the push bar facilitates in the moving of the undercarriage or welder and/or power supply when moving over a curb or other obstacle. Still another preferred embodiment, the push bar includes a base section which is angularly connected to the base portion to help transmit forces between the push bar and base of the undercarriage to facilitate in the movement of the undercarriage. In another preferred embodiment, a lift bar is connected to the push bar. In one specific embodiment, the lift bar is connected between the handle portion of the push bar. In another specific embodiment, the lift bar extends outwardly from the mid-portion or handle portion of the push bar. Preferably, the handle bar extends generally outwardly from the push bar in a plane generally parallel to the ground surface. The lift bar is designed to enable an operator to easily move the rear portion of the undercarriage over a curb surface or other obstacle once the front wheels of the undercarriage have been positioned on the top surface of the curved surface or other obstacle. In accordance with still yet another embodiment, the push bar includes one or more holders or hooks. The holders and/or hooks are designed to enable attachment of related welding and/or power supply equipment such as wires, hoses, gloves, goggles, helmets and the like to the undercarriage so that both the welder and/or power supply and the parts and accessories can be simultaneously and conveniently moved.

The primary object of the present invention is the provision of a welder and/or power supply that can be easily moved over a variety of ground surfaces.

Another object of the present invention is the provision of a welder and/or power supply positioned on an undercarriage or integrated moving device, which undercarriage or integrated moving device is economical to produce, efficient to operate, reduces the amount of force required to move over a variety of surfaces, and is simple to operate.

Yet another object of the present invention is the provision of an undercarriage or integrated moving device which maintains the center of gravity of a welder and/or power supply on one axle and/or spindle or between two axles and/or spindles during the operation of the undercarriage.

Still yet another object of the present invention is the provision of an undercarriage or integrated moving device which reduces the distance between the axles and/or spindles to enable easier operation over a variety of ground surfaces.

In accordance with still yet another object of the present invention is the provision of an undercarriage or integrated moving device having front wheels that are smaller in diameter to the rear wheels to facilitate in the moving of the undercarriage over a ground surface.

Another object of the present invention is the provision of an undercarriage or integrated moving device which includes a front design that protects the front of the undercarriage or welder and/or power supply from damage and facilitates in the movement of the undercarriage over a ground surface.

Still another object of the present invention is the provision of an undercarriage or integral moving device which includes a brake mechanism to prevent undesired movement.

Yet another object of the present invention is the provision of an undercarriage or integral moving device which includes a handle that facilitates in the moving of the undercarriage over uneven ground surfaces, and facilitates in the movement of the undercarriage or welder and/or power supply over a variety of ground surfaces.

A further object of the present invention is the provision of an undercarriage or integral moving device which can traverse soft ground surfaces.

Still yet another object of the present invention is the provision of the base of an undercarriage or welder and/or power supply that is sufficiently elevated from the ground to traverse rough ground surfaces.

Another object of the present invention is the provision of an undercarriage or integral moving device which includes one or more hooks and/or containers to facilitate in carrying various components of the welder and/or power supply.

These and other objects and advantages will become apparent to those skilled in the art upon reading the following description taken together with the accompanied drawings.

BRIEF DESCRIPTION OF THE DRAWINGS

Reference may now be made to the drawings, which illustrate various embodiments the invention may take in physical form and in certain parts and arrangements of parts wherein.

DETAILED DESCRIPTION OF THE PREFERRED EMBODIMENT

Referring now to the drawings, wherein the showing are for the purpose of illustrating the preferred embodiments of the invention only and not for the purpose of limiting the same, FIGS. 1–7 illustrate an undercarriage 20 adapted to transport a welder and/or power supply W over a ground surface G. Undercarriage 20 includes a base 30 having an upper surface to support a welder W. Base 30 includes two base legs 32, 34 which are oriented generally parallel to one another. Secured to the base legs are two side flanges 40, 42. Each of the base legs include one or more leg openings 36 which are attachment points to secure welder W to base 30 by one or more welder bolts 38.

Side flanges 40 and 42 include a front portion 44, a mid-portion 46 and a back portion 48. Front portion 44 and back portion 48 extend downwardly a lesser distance from base legs 32, 34 than mid-portion 46. The downward distance of front portion 44 varies along the length of the front portion such that the section nearest the front end of the base legs extends downwardly less than a section spaced farther from the front end of the base leg. The base legs and respective side flange design are generally symmetrical to one another. The configuration of the front portion 44 of the side flanges facilitates in the movement of the undercarriage 20 over uneven surfaces, as will be later described. Connected to the front end of the base legs 32 and 34 and to front portion 44 of side flanges 40 and 42 is a bumper 60. Bumper 60 is designed to rigidify the structure of the undercarriage and to facilitate in the protection of the welder and/or other components on the undercarriage during operation. Preferably, the bumper is welded to the base legs and side flanges, however, other connection mechanisms and/or arrangements can be used.

Figure 3:
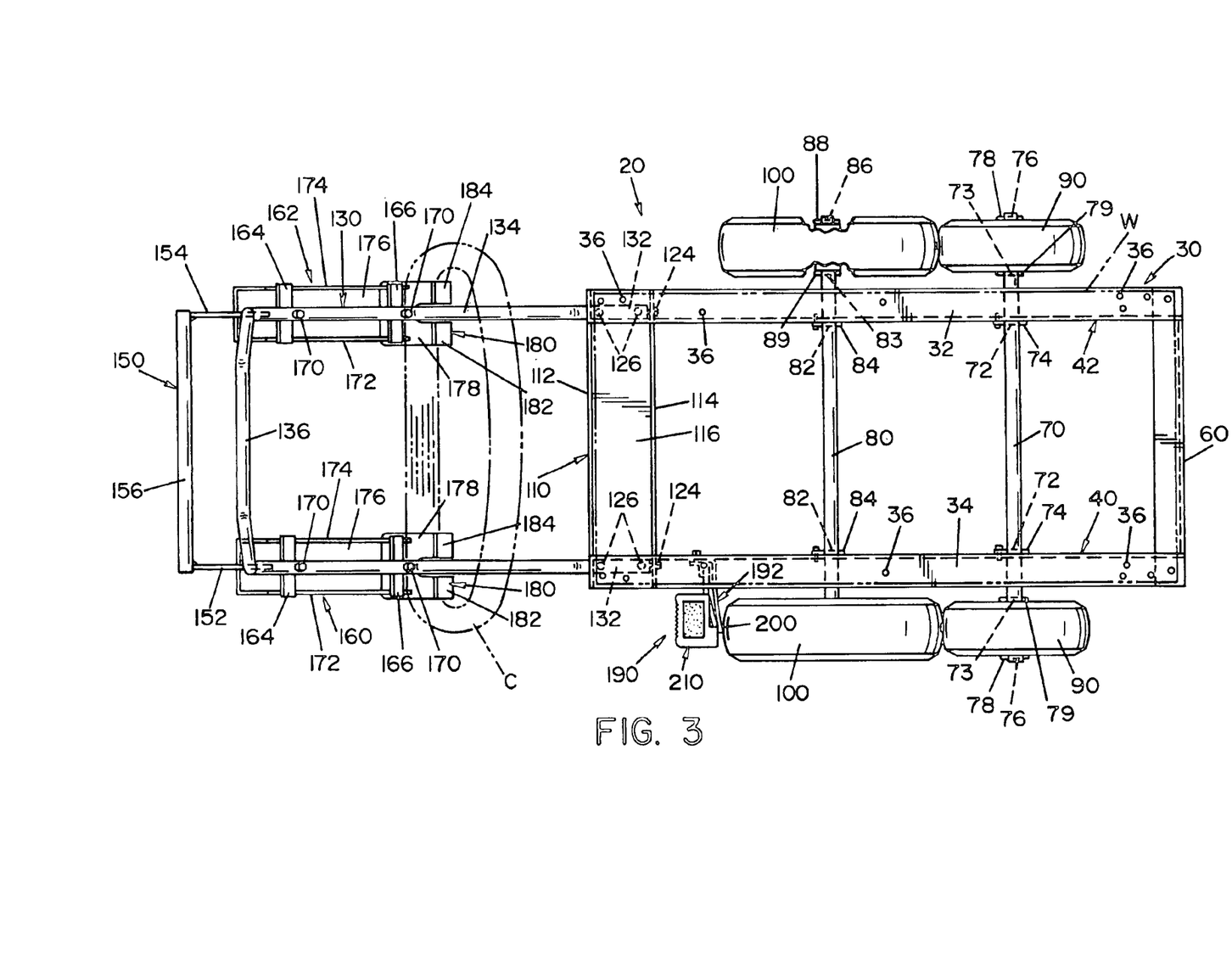
FIG. 3 is a top plan view of the undercarriage without the welder mounted on the undercarriage.
Figure 4:
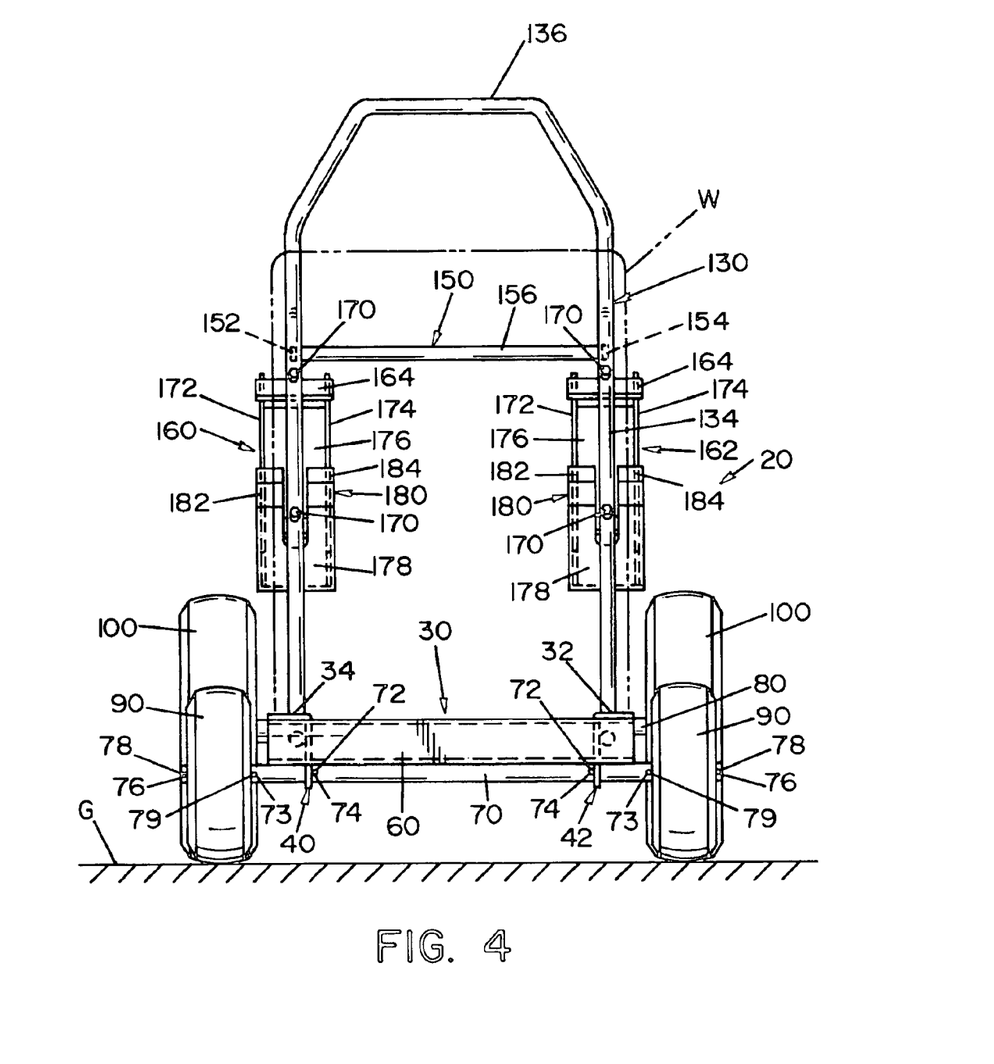
FIG. 4 is a front elevation view of the undercarriage of FIG. 1.
Figure 5:
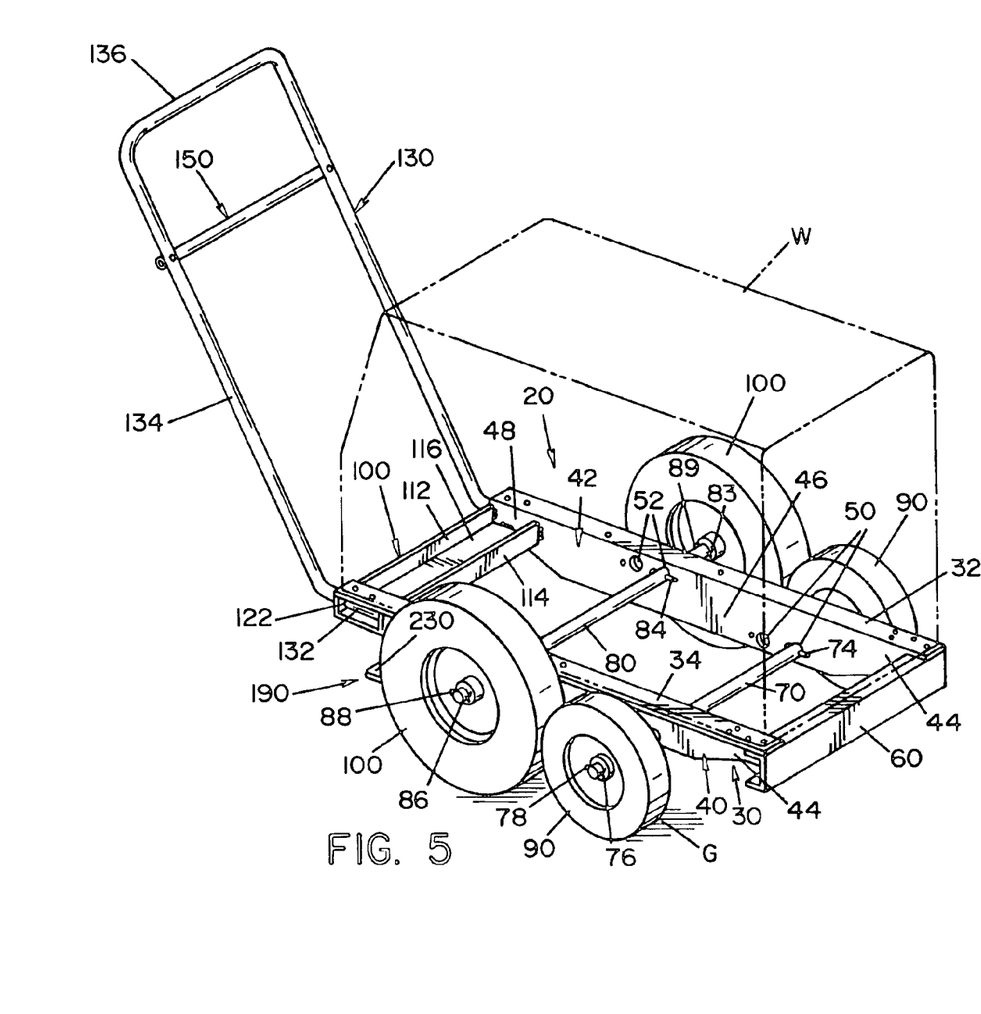
FIG. 5 is the preferred embodiment of the undercarriage which includes a simpler handle design.

Side flanges 40 and 42 include front openings 50 and rear openings 52. As shown in FIG. 5, there are two front openings 50 and two rear openings 52 on each of the two flanges. The multiple openings allow multiple positioning of the axles 70 and 80 to accommodate different radii sized tires 90, 100 connected to the axles and/or different center of gravity locations. The positioning of front opening 50 and rear opening 52 are such that the rear openings and front openings straddle the mid-point along the longitudinal length of the two base legs. Front axle 70 is secured in position within front openings 50 on flanges 40, 42 by axle pins 74 secured within the openings 72 as shown in FIGS. 3 and 4. Similarly, rear axle 80 is secured within rear openings 52 on side flanges by axle pins 84 positioned in openings 82. Front wheels 90 are secured to the two ends of axle 70 by positioning wheel opening 92 about the end of axle 70 and securing the wheels in position by wheel pins 78 and 79 positioned in openings 76 and 73. Similarly, rear wheel 100 is positioned on rear axle 80 such that rear wheel opening 102 is positioned over the end of rear axle 80 and wheel pins 88 and 89 are inserted into end openings 86 and 83 to secure the rear wheels on the rear axle.

Figure 1:
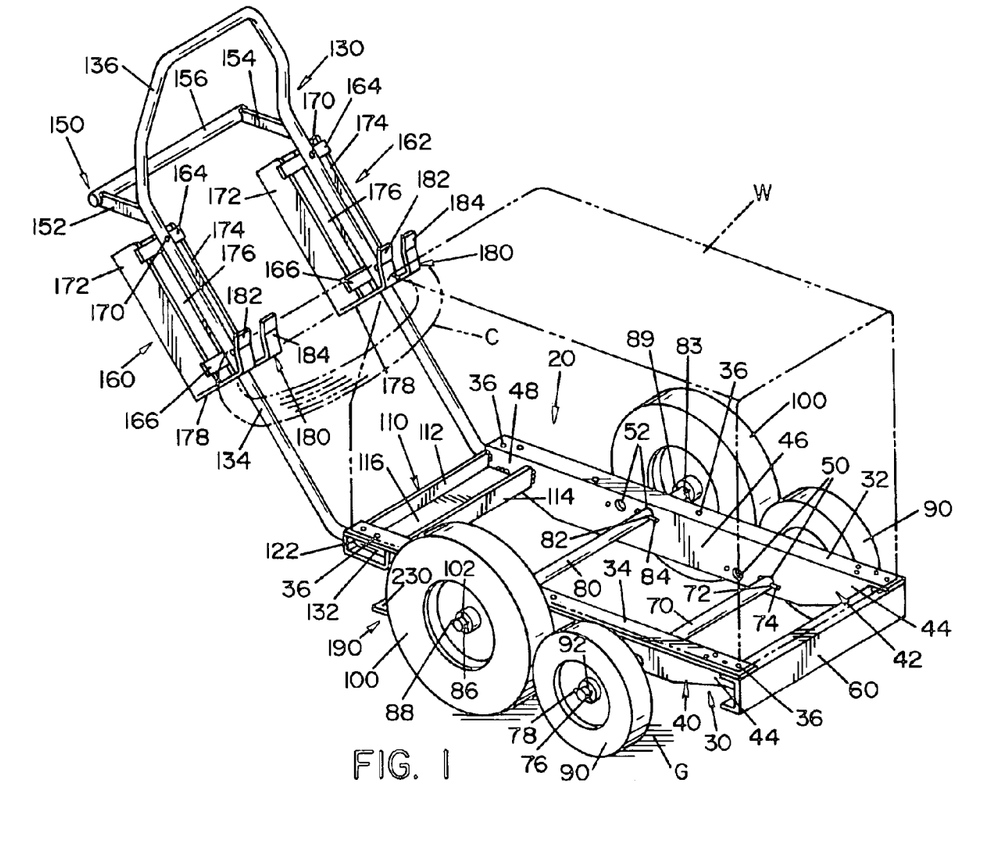
FIG. 1 is a perspective view illustrating one embodiment welder transporter of the present invention with a welder mounted on an undercarriage.

As shown in FIG. 1, front wheel 90 has a smaller radius than rear wheel 100. In one preferred embodiment, front wheel 90 has a radius of about 4 to 6 inches and rear wheel 100 has a radius of about 7 to 9 inches. The width of the tread of the smaller front wheel is the same as or slightly smaller than the width of the tread of rear wheel 100. In one preferred embodiment, the width of the tread of front wheel 90 is about 3.25 to 4 inches and the width of the tread of the rear tire 100 is about 3.5 to 4.5 inches. To accommodate the different radii of the front and rear tires, front opening 50 and rear opening 52 on side flanges 40, 42 are positioned to maintain the top surface of base legs 32, 34 substantially parallel to the top of the ground surface G. As shown in FIG. 1, front openings 50 are spaced at a greater distance from the top surface of base legs 32, 34 than rear opening 52.

Figure 2:
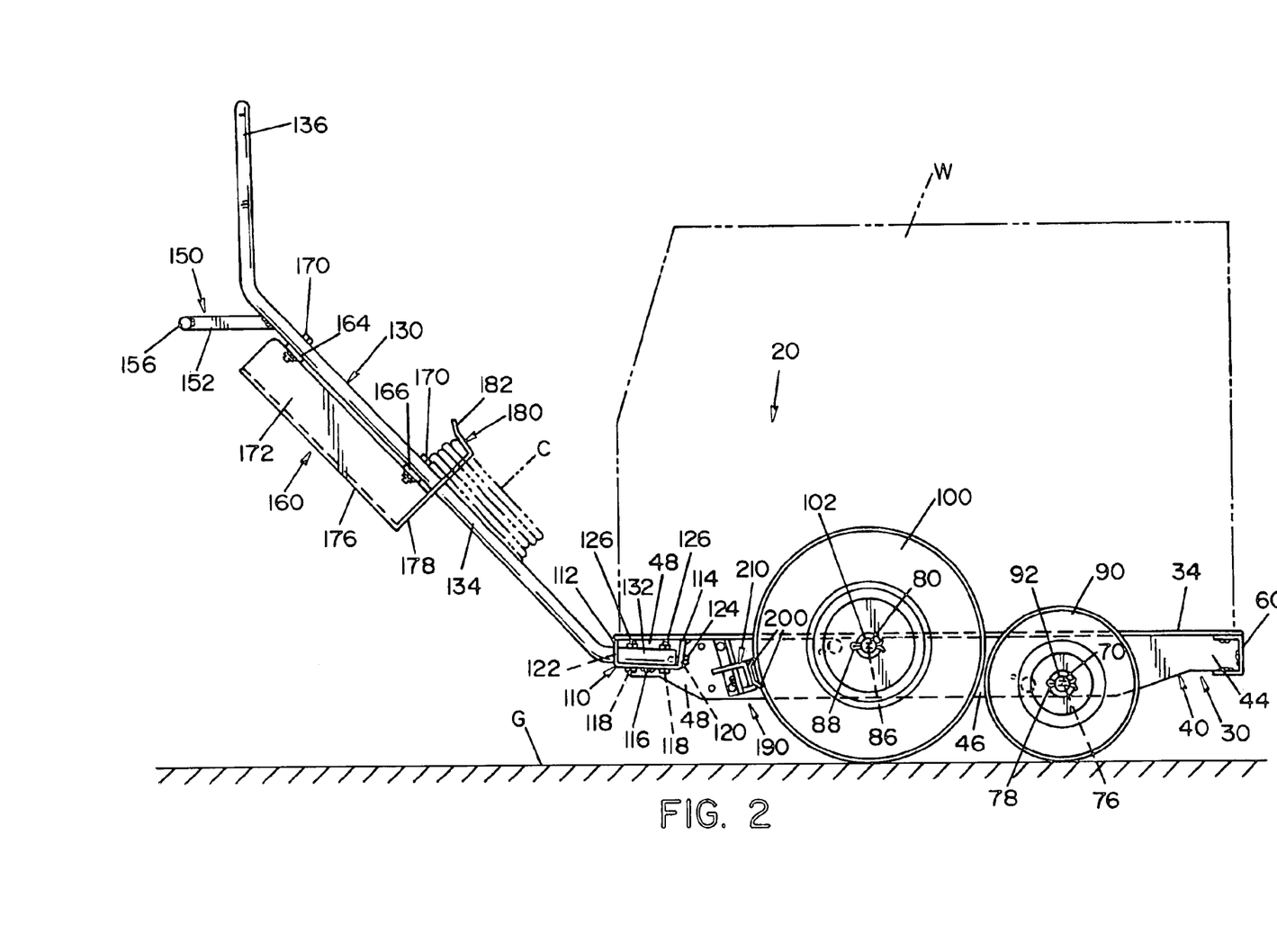
FIG. 2 is a side elevation view of the undercarriage of FIG. 1.

Secured to the rear of base legs 32, 34 is a rear brace 110. Rear brace 110 includes a rear flange 112, front flange 114, and a bottom plate 116. Preferably, rear brace 110 is welded to the base legs and/or the side flanges; however, other connection arrangements can be used. Rear brace 110 serves to rigidify undercarriage 20 and is used as a connection point for push bar 130. Referring now to FIG. 2, rear flange 112 includes rear openings 122 and front flange 114 includes front openings 120. Rear openings 122 are adapted to receive the base portion 132 of push bar 130 to orient the push bar during mounting. Base portion 132 is oriented into rear brace 110 by bolts 124 which are positioned through front openings 120 of front flange 114, and secured to rear brace by bolts 126 through plate openings 118 of bottom plate 116. Base portion 132 is secured in rear brace 110 so that base portion 132 is angularly oriented with respect to the top surface of base legs 32, 34. Preferably, base portion 132 is oriented at an angle of about 0° to 10°. Secured to the ends of base portion 132 is middle portion 134 of push bar 130. Middle portion 134 is oriented to base portion 132 at an angle between about 15° and 85°, and preferably about 35° to 70°. Secured to the other end of middle portion 134 is handle portion 136. As shown in FIG. 2, push bar 130 is secured to rear brace 110 such that handle portion 136 lies in a plane generally perpendicular to ground surface G. Secured to the upper portion of middle portion 134 is a lift bar 150. Lift bar 150 includes a bar 156 connected at its ends by flange 152 and 154. Flanges 152 and 154 are connected to middle portion 134 by bolts, screws, weld or the like. As shown in FIG. 2, lift bar 150 is secured to push bar 130 such that when push bar 130 is secured to rear brace 110, lift bar 150 lies in a plane generally parallel to ground surface G.

Referring now to FIG. 1, an alternate embodiment of the push bar 130 is illustrated. The handle portion 136 is angularly oriented to middle portion 134 at an angle of about 35° to 55°.

Secured to push bar 130 are two tool holders 160, 162. Each of the tool holders includes side flanges 172, 174, a back flange 176 and a bottom flange 178 to form a box-like structure for holding tools, gloves and other welding accessories. The two tool holders include a mount flange 164, 166 each having mount openings to receive a holder bolt 170 to mount the tool holders to push bar 130. Extending outwardly from bottom flange 178 of the tool holders is a hook 180. Hook 180 includes two hook legs 182, 184 which are designed to support cables C, wires, hoses and other accessories for the power supply and/or welder W.

An alternative design of push bar 130 is illustrated in FIG. 5. In this design, push bar 130 includes a base portion 132, a middle portion 134, and a handle portion 136. Middle portion 134 is oriented to base portion 132 at an angle between about 15° and 90°. Secured to middle portion 134 is a lift bar 150 which is bolted, screwed, welded or the like to middle portion 134.

Referring now to FIGS. 2, 3, 5, 6 and 7, there is shown a brake 190 designed to engage the right rear wheel 100. Brake 190 includes a brake plate 192 having wheel engaging tabs 200. Tabs 200 are designed to frictionally engage the outer surface of rear wheel 100. Brake plate 192 includes a front section 194 wherein tabs 200 are secured thereto, a center section 196 and a mount section 198. Brake plate 192 is secured to brake brace 220 along with brake arm 210 by brake bolt 226. Brake brace 220 includes a mount opening 224 to receive a mount bolt 228 to secure brake brace 220 to side flange 40. Brake brace 220 also includes a brake opening 222 to receive a brake bolt 226 which passes through plate opening 199 of brake plate 192 and arm opening 212 of brake arm 210 to secure both the brake plate and brake arm to the brake brace. Brake arm 210 includes an angular section 211 and a front section 213, also there is a foot flange 230 extending outwardly from the brake arm. Foot flange 230 includes a rough surface 232 to provide a gripping surface for an operators shoe or boot.

Figure 6:
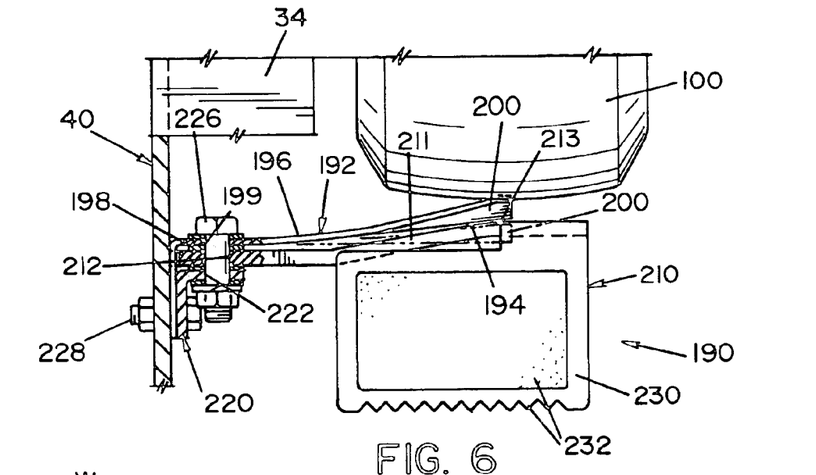
FIG. 6 is an enlarged top elevation, cross-sectional view of the brake mechanism on the rear of the undercarriage.
Figure 7:
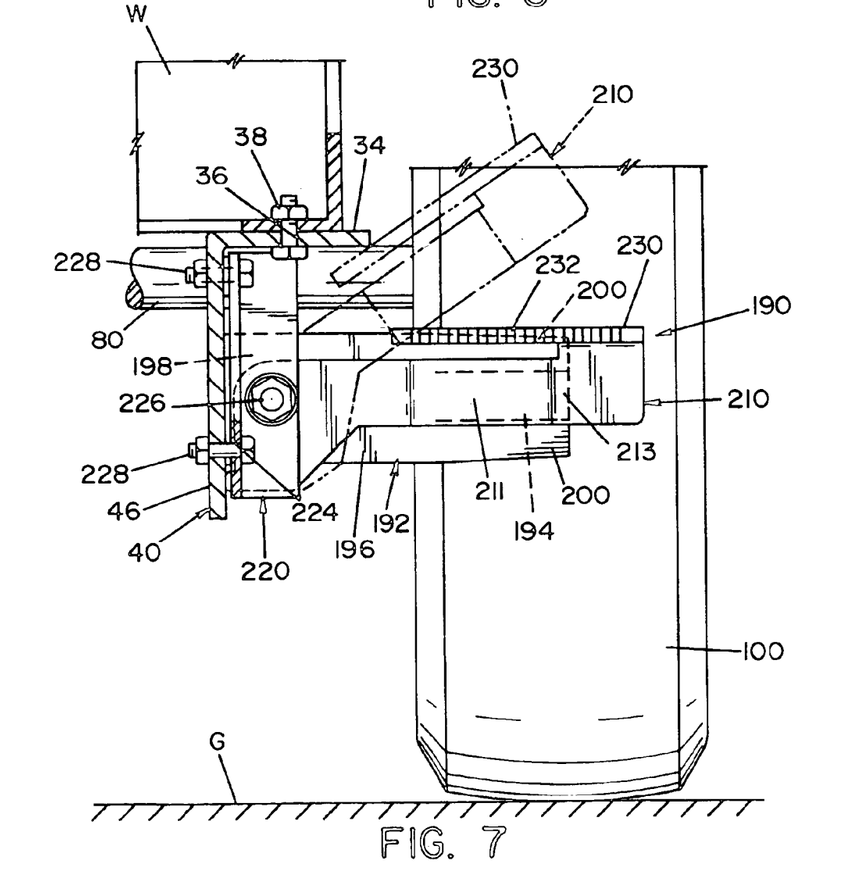
FIG. 7 is an enlarged rear elevation, cross-sectional view of the brake system as shown in FIG. 6.

Referring now the FIGS. 6 and 7, brake arm 210 is designed to rotatably move about brake bolt 226 to engage and disengage angular section 211 and front section 213 of brake arm 210 to move brake plate 192 into contact with tire 100. As shown in FIG. 6, brake arm 210 is positioned in the lock position, whereby brake arm 210 has been moved downwardly to engage front section 213 and front section 194 of brake plate 192, thereby forcibly moving front section 194 toward rear tire 100 until wheel engaging tabs 200 frictionally engages rear wheel 100.

As shown in phantom lines in FIG. 7, brake arm 210 has been moved into the unlocked position, whereby brake arm 210 is raised upwardly to disengage the brake arm from front section 194 and center section 196 thereby allowing brake plate 192 to move into its unstressed position and allowing tabs 200 to moveably position away from the surface of rear wheel 100 as shown in phantom line in FIG. 6, to allow the rear wheel to freely rotate.

Figure 8:
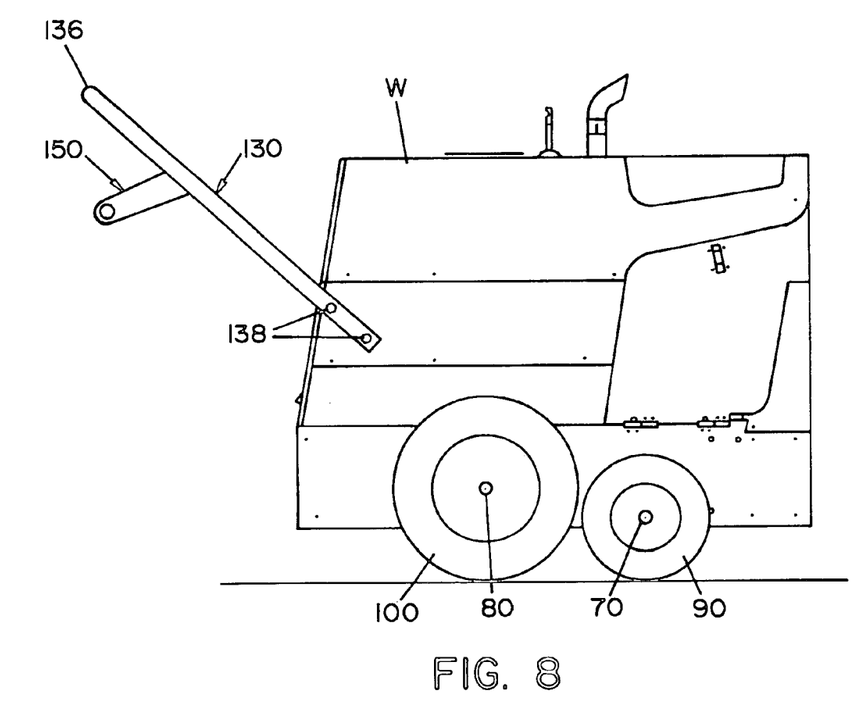
FIG. 8 is a perspective view of an alternate embodiment of a welder transporter of the present invention having a handle and wheels secured to the welder.

Referring now to FIG. 8, there is illustrated an alternate embodiment of the present invention. As illustrated in FIG. 8, the welder W is integrated with a handle and wheels to enable the welder to be transported to various locations and to traverse various surfaces. Welder W includes a push bar 130 secured to the sides of welder W by four bolts 138. As can be appreciated more or less bolts can be used, and/or other means can be used to secure the push bar to the welder. Push bar 130 includes a handle portion 136 and a lift bar 150. The orientation of the push bar on welder W is substantially the same as shown and described in FIGS. 1–5. The use of handle portion 136 and lift bar 150 is the same as for the undercarriage described in FIGS. 1–5. Front wheels 90 and rear wheels 100 are secured to the base of welder W. The front and rear wheels are rotatable secured to front axle 70 and rear axle 80, respectively. As can be appreciated, the front axle and/or rear axle can be substituted with a bolt or spindle arrangement. The arrangement and size of the front and rear wheels is substantially the same as the arrangement and size of the front and rear wheels of the undercarriage as shown and described in FIGS. 1–5.

Figure 11:
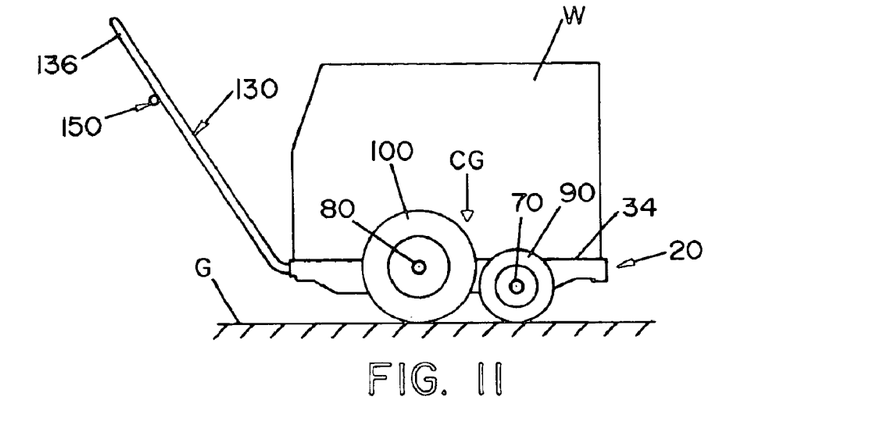
FIGS. 11–13 are pictorial views of the undercarriage moving over various ground surfaces.
Figure 12:
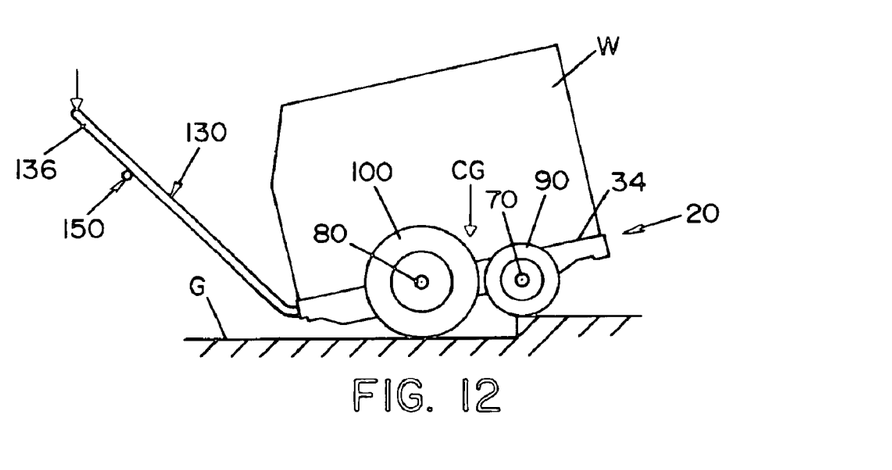
Figure 13:
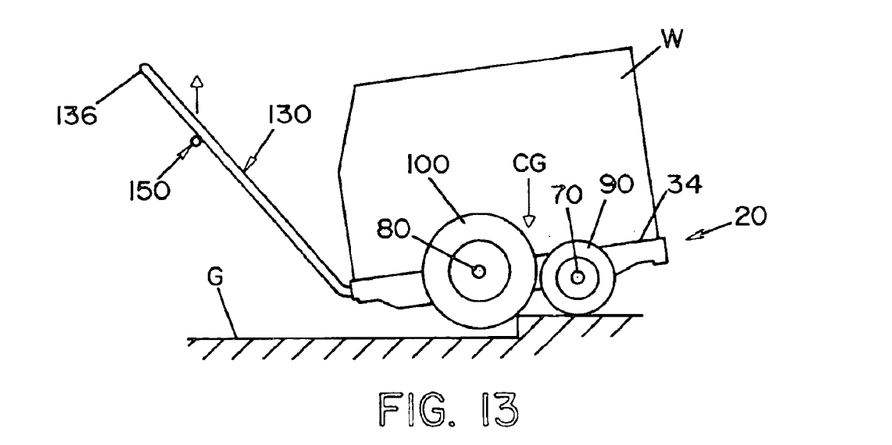

The operation of undercarriage illustrated in FIGS. 1–7 will now be described with reference to FIGS. 11–13. As can be appreciated, the integrated welder and welder transport arrangement disclosed in FIG. 8 is operated similarly to the undercarriage shown in FIG. 1–7. As shown in FIG. 11, welder and/or power supply W is mounted onto the top surface of base legs 32, 34 such that the front edge and rear edge of the welder and/or power supply does not extend beyond the two ends of the base legs. In addition, the welder and/or power supply W is mounted such that the center of gravity of the welder and/or power supply is positioned between front axle 70 and rear axle 80. Undercarriage 20 is shown in FIG. 11 to be positioned on a planar ground surface and illustrates the top surface of base legs 32 and 34 to be generally parallel to the top of the ground surface. Undercarriage 20 is moved over ground surface G by pushing and/or pulling on push bar 130. Referring now to FIGS. 12 and 13, undercarriage 20 is illustrated as being moved over an uneven surface or curb surface in the ground. As shown in FIG. 12, undercarriage 20 is initially moved backwards about rear axle 80 by pushing/pulling downwardly on push bar 130 until the bottom of front wheels 90 can be positioned onto the top of the curb surfaces or other obstacle. As shown in FIG. 12, the center of gravity of the welder and/or power supply is still maintained between the front axle and rear axle when the undercarriage is moved. As can be appreciated, this configuration requires less force on push bar 130 to successfully place front wheel 90 onto the top surface of the curb or other obstacle in the ground surface G. Furthermore, maintaining the center of gravity of the welder and/or power supply between the front and rear axles prevents the undercarriage from continuing to rotate backwardly on the rear axle once the front wheel is positioned on the top of the curb in the ground surface. FIG. 13 illustrates the completion of moving the undercarriage over the curb in the ground surface. Once the front wheel 90 is moved on the top of the curb, undercarriage 20 is moved forwardly until the rear wheel 100 engages the uneven ground surface. Thereafter, the operator grasps lift bar 150 and pulls/pushes upwardly to move the rear wheel and the remaining portion of the undercarriage onto the top surface of the curb or other obstacle on the ground surface. As can be appreciated from the geometry of positioning of the front and rear wheels with respect to the center of gravity of the welder and/or power supply, and with respect to the positioning of the axles along the longitudinal length of the undercarriage, the force necessary to both rearwardly move the undercarriage as described above, and to move the rear wheel 100 onto the top of a curb or other obstacle as shown in FIG. 13 is significantly reduced, as compared to prior undercarriages having a single axle only or a single axle and a caster.

Figure 9:
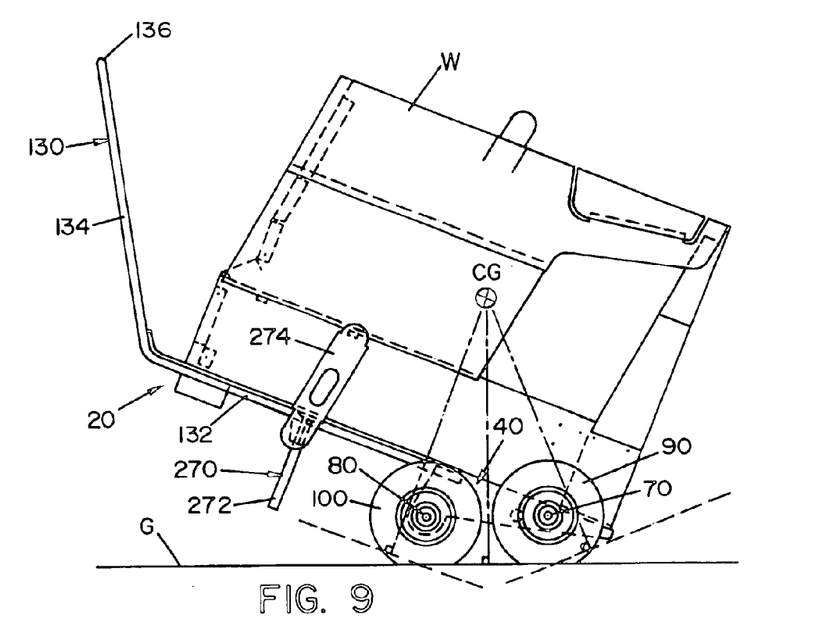
FIG. 9 is a perspective view of another alternate embodiment of a welder transporter of the present invention with a welder mounted on an undercarriage.
Figure 10:
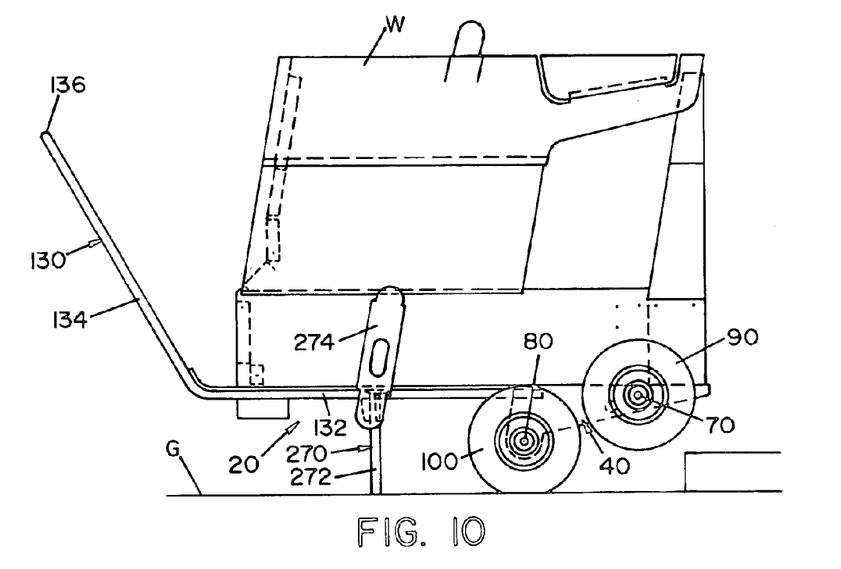
FIG. 10 is a perspective view of the undercarriage of FIG. 9 showing the undercarriage in a tilted position.

Referring now to FIGS. 9 and 10, an alternate embodiment of undercarriage 20 is shown. As illustrated in FIG. 9, welder W is secured to undercarriage 20 by standard means such as bolting, welding, belts, cables and/or the like. Undercarriage 20 includes two side flanges 40, 42. The side flanges are generally triangular shaped,; however other shapes can be used. Secured to the side flanges are a front and rear axle 70 and 80, respectively. Rotatable secured to the front and rear axles are front wheels 90 and rear wheels 100, respectively. The position of the front and rear axles and the size of the front and rear wheels are selected such that the plane of the top surface of the undercarriage slope downwardly toward ground surface G. Preferably, the plane of the top surface of the undercarriage slopes downwardly at an angle of about 5 to 60 degrees, and more preferably about 10 to 35 degrees. As illustrated in FIG. 9, the size of the front and rear wheels are generally the same; however, the rear wheel can be designed to have a greater radius than the front wheel. The spacing of the front and rear wheels from one another and the width of the wheels is substantially similar to the front and rear wheels illustrated and discussed in FIGS. 1–5. Undercarriage 20 also includes a push bar 130. Push bar 130 can be designed similar to the push bar illustrated and described in FIG. 1–4 or FIG. 5. As shown in FIGS. 9 and 10, push bar 130 is designed similar to the push bar illustrated and described in FIG. 5. As such, push bar 130 includes a base portion 132, a middle portion 134, and a handle portion 136. Middle portion 134 is oriented to base portion 132 at an angle between about 15° and 90°. Secured to middle portion 134 is a lift bar which is bolted, screwed, welded or the like to middle portion 134. Base portion 132 of the push bar is illustrated as extending from the rear of the welder W to the ends of flanges 40, 42. In such configuration, base portion 132 is positioned substantially parallel to the base of welder W as base portion 132 extends from the rear of the welder to flanges 40, 42. As shown in FIG. 9, the base of welder W is seated on the top surface of base portion 132 and is also preferably secured to the base portion of push bar 130. Undercarriage 20 includes a stand 270 positioned between the rear of flanges 40, 42 and the rear of welder W. Stand 270 includes at least one leg 272 extending downwardly from the base of welder W. Leg 272 is secured to base portion 132 of push bar 130 and/or to one or both sides of welder W. As illustrated in FIGS. 9 and 10, leg 272 is secured to a side support 274 which in turn is secured to the side of welder W and base portion 132.

As shown in FIG. 9, welder W is positioned on undercarriage 20 in the transport mode such that the center of gravity of the welder is positioned on or between the central axis of front and rear wheels 90 and 100. When the welder is transported by undercarriage 20, the end of leg 272 is elevated from ground surface G. The advantages of maintaining the center of gravity of the welder between the front and rear wheels during transport of the welder have been previously described, thus will not be repeated. Referring now to FIG. 10, undercarriage 20 is positioned in the rest position. In the rest position, welder W is generally stored or operated. The end of leg 272 is in contact with the ground surface in the stored positioned. Preferably the length of leg 272 is selected such that the base of welder W lies in a plane generally parallel to the ground surface when the undercarriage in the rest position. The end of leg 272 also functions as a brake in the rest position thereby inhibiting or preventing the equipment or unit from moving when in the rest position. As a result, a separate brake mechanism need not be included on the undercarriage; however, a brake mechanism can be used and can be designed similar to the brake mechanism illustrated and described in FIGS. 6 and 7. The position of the undercarriage in FIG. 10 also illustrates how the undercarriage is positioned to traverse a curb, bump or other obstacle on the ground surface. The undercarriage is tilted backwards on the rear wheel until the front wheel is elevated, preferably above, the curb, bump or other obstacle, and then the undercarriage is moved forward until the front wheel in positioned in the top surface of the curb, bump or other obstacle. Once the front wheel is positioned on the top surface of the curb, bump or other obstacle, the undercarriage is moved forward and subsequently lifted by use of the push bar until the rear wheel are positioned on the surface of the curb, bump or other obstacle. Thereafter, the welder is moved over the ground surface as in the transport position as shown in FIG. 9.

The invention has been described with reference to a preferred embodiment and alternates thereof. It is believed that many modifications and alterations to the embodiments disclosed will readily suggest itself to those skilled in the art upon reading and understanding the detailed description of the invention. It is intended to include all such modifications and alterations insofar as they come within the scope of the present invention.

What is claimed is:

1. A moveable undercarriage for supporting and moving a welder and/or power supply over a ground surface comprising a base to support the welder and/or power supply, a front and rear axle secured to said base, two front wheels rotatably secured to said front axle, two rear wheels rotatably secured to said rear axle, and a push bar secured to said base, said rear wheels having a radius that is greater than a radius of said front wheels, said base having a generally flat top surface lying in a plane generally parallel to a flat ground surface, said front and rear axles positioned on said base such that a center of gravity of the welder and/or power supply lies between said axles, said front and rear axle spaced apart along a longitudinal axis of said base at a distance less than about 3 times the sum of the radii of said front and rear wheels.

2. The undercarriage as defined in claim 1, wherein the spacing between said front and rear axles is between about 1.0–1.5 times the sum of the radii of said front and rear wheels.

3. The undercarriage as defined in claim 1, wherein the ratio rear wheel radius to said front wheel radius is between 1:1 to 2.5:1.

4. The undercarriage as defined in claim 2, wherein the ratio of said rear wheel radius to said front wheel radius is between 1:1 to 2.5:1.

5. The undercarriage as defined in claim 1, wherein said base includes two side edges and side flanges connected thereto and extending downwardly therefrom, at least one axle secured to said side flanges.

6. The undercarriage as defined in claim 4, wherein said base includes two side edges and side flanges connected thereto and extending downwardly therefrom, at least one axle secured to said side flanges.

7. The undercarriage as defined in claim 5, wherein said side flanges having a forward section positioned forwardly of said front axle and a mid-section positioned between said front and rear axle, said flange mid-section extending downwardly a length that is greater than the downward length of said forward section.

8. The undercarriage as defined in claim 6, wherein said side flanges having a forward section positioned forwardly of said front axle and a mid-section positioned between said front and rear axle, said flange mid-section extending downwardly a length that is greater than the downward length of said forward section.

9. The undercarriage as defined in claim 1, wherein said front wheels are positioned rearwardly of a front edge of said base and said rear wheels are positioned forwardly of a rear edge of said base.

10. The undercarriage as defined in claim 8, wherein said front wheels are positioned rearwardly of a front edge of said base and said rear wheels are positioned forwardly of a rear edge of said base.

11. The undercarriage as defined in claim 1, including a brake, said brake including a brake plate secured to a brake arm, a brake arm pivotally connected to said base to move said brake plate into contact and out of contact with at least one of said rear wheels, and a brake bar movable between a locked and unlocked position, said brake bar in said locked position engaging said brake arm to move said brake plate into contact with said rear wheel.

12. The undercarriage as defined in claim 10, including a brake, said brake including a brake plate secured to a brake arm, a brake arm pivotally connected to said base to move said brake plate into contact and out of contact with at least one of said rear wheels, and a brake bar movable between a locked and unlocked position, said brake bar in said locked position engaging said brake arm to move said brake plate into contact with said rear wheel.

13. The undercarriage as defined in claim 1, wherein said push bar including a base section, a middle section and a handle section, said base section secured to said base, said middle section attached to said base section at an angle of about 15–70°, said handle section attached to said middle section at an angle of about 15–70°, said handle section lying in a plane generally perpendicular to said ground surface.

14. The undercarriage as defined in claim 12, wherein said push bar including a base section, a middle section and a handle section, said base section secured to said base, said middle section attached to said base section at an angle of about 15–70°, said handle section attached to said middle section at an angle of about 15–70°, said handle section lying in a plane generally perpendicular to said ground surface.

15. The undercarriage as defined in claim 14, wherein said base section lies in a plane that is non-parallel to said top surface plane of said base.

16. The undercarriage as defined in claim 1, including a lift bar secured to said push bar.

17. The undercarriage as defined in claim 4, including a lift bar secured to said push bar.

18. The undercarriage as defined in claim 15, including a lift bar secured to said push bar.

19. The undercarriage as defined in claim 1, including at least one hook arrangement secured to said push bar.

20. The undercarriage as defined in claim 18, including at least one hook arrangement secured to said push bar.

21. The undercarriage as defined in claim 20, including at least one holding compartment secured to said push bar and said hook arrangement.

22. The undercarriage as defined in claim 1, including a bumper flange secured to the front edge of said base.

23. The undercarriage as defined in claim 21, including a bumper flange secured to the front edge of said base.

24. The undercarriage as defined in claim 1, wherein said base having a length and a width at least equal to a length and a width of the welder and/or power supply.

25. The undercarriage as defined in claim 23, wherein said base having a length and a width at least equal to a length and a width of the welder.

26. The undercarriage as defined in claim 5, wherein said side flanges each including at least three axle openings being generally aligned with one another.

27. The undercarriage as defined in claim 6, wherein said side flanges each including at least three axle openings being generally aligned with one another.

28. The undercarriage as defined in claim 25, wherein said side flanges each including at least three axle openings being generally aligned with one another.

29. The undercarriage as defined in claim 1, wherein said base is rearwardly rotatable about said rear wheels between a fully tilted position and a non-tilted position, said center of gravity of said welder and/or power supply lying on or forwardly of said rear axle and rearwardly of said front axle when said base is in said fully tilted position.

30. The undercarriage as defined in claim 4, wherein said base is rearwardly rotatable about said rear wheels between a fully tilted position and a non-tilted position, said center of gravity of said welder and/or power supply lying on or forwardly of said rear axle and rearwardly of said front axle when said base is in said fully tilted position.

31. The undercarriage as defined in claim 28, wherein said base is rearwardly rotatable about said rear wheels between a fully tilted position and a non-tilted position, said center of gravity of said welder and/or power supply lying on or forwardly of said rear axle and rearwardly of said front axle when said base is in said fully tilted position.

32. A moveable undercarriage for supporting and moving a welder or a power supply over a ground surface comprising a base structure, at least one front wheel rotatably secured to said base structure, at least one rear wheel rotatable secured to said base structure, and a push bar secured to said base structure, said rear wheel having a radius that is equal to or greater than a radius of said front wheel, said at least one front wheel and said at least one rear wheel rotating about axes positioned on said base structure such that a center of gravity of the welder or power supply lies on or between said axes, said axes being spaced apart along the longitudinal axis of said base structure so that the spacing is less than about 3 times the sum of the radii of said front and rear wheels.

33. The undercarriage as defined in claim 32, wherein said welder or power supply is positioned in said base structure.

34. The undercarriage as defined in claim 33, wherein said welder or power supply is secured to said base structure.

35. The undercarriage as defined in claim 32, including at least one axle secured to said base structure, said rear wheel rotatably secured to said axle.

36. The undercarriage as defined in claim 32, including at least one axle secured to said base structure, said front wheel rotatably secured to said axle.

37. The undercarriage as defined in claim 32, including at least one spindle secured to said base structure, said rear wheel rotatably secured to said spindle.

38. The undercarriage as defined in claim 32, including at least one spindle secured to said base structure, said front wheel rotatably secured to said spindle.

39. The undercarriage as defined in claim 32, wherein the spacing between said axes of said front and rear wheels is between about 1.0–1.5 times the sum of the radii of said front and rear wheels.

40. The undercarriage as defined in claim 32, wherein said at least one front wheel positioned rearwardly of a front edge of said base structure and said at least one rear wheel positioned forwardly of a rear edge of said base structure.

41. The undercarriage as defined in claim 32, including a brake, said brake including a brake plate which is moveable into and out of contact with said at least one rear wheel.

42. The undercarriage as defined in claim 41, including a brake bar movable between a locked and unlocked position, said brake bar causing said brake plate to move into contact with said at least one rear wheel when said brake bar is moved into the locked position.

43. The undercarriage as defined in claim 32, wherein said push bar including a base section and a middle section, said base section connected to said middle section at an angle of about 15°–90°.

44. The undercarriage as defined in claim 32, including a lift bar secured to said push bar.

45. The undercarriage as defined in claim 1, wherein said center of gravity of the welder and/or power supply lies on or between said axles when the welder and/or power supply is a non-tilted portion on a generally flat ground surface and when the welder and/or power supply is in a tilted position on a generally flat ground surface.

46. The undercarriage as defined in claim 2, wherein said center of gravity of the welder and/or power supply lies on or between said axles when the welder and/or power supply is a non-tilted portion on a generally flat ground surface and when the welder and/or power supply is in a tilted position on a generally flat ground surface.

47. The undercarriage as defined in claim 32, wherein said center of gravity of the welder or power supply lies on or between said axes when the welder or power supply is a non-tilted portion on a generally flat ground surface and when the welder or power supply is in a tilted position on a generally flat ground surface.

48. A moveable undercarriage for supporting and moving a welder or a power supply over a ground surface comprising a base structure, at least one front wheel rotatably secured to said base structure, at least one rear wheel rotatable secured to said base structure, and a push bar secured to said base structure, said rear wheel having a radius that is equal to or greater than a radius of said front wheel, said at least one front wheel and said at least one rear wheel rotating about axes positioned on said base structure which are spaced apart along the longitudinal axis of said base structure so that the spacing is less than about 2 times the sum of the radii of said front and rear wheels.

49. The undercarriage as defined in claim 48, wherein the spacing between said front and rear axes is between about 1.0–1.5 times the sum of the radii of said front and rear wheels.

50. The undercarriage as defined in claim 48, wherein said front and rear axles positioned on said base structure such that a center of gravity of the welder or power supply lies on or between said axes when the welder or power supply is in a non-tilted position on a generally flat ground surface and when the welder or power supply is in a tilted position on a generally flat ground surface.

* * * * *